United States Patent
Herzi et al.

(10) Patent No.: US 9,606,889 B1
(45) Date of Patent: Mar. 28, 2017

(54) SYSTEMS AND METHODS FOR DETECTING MEMORY FAULTS IN REAL-TIME VIA SMI TESTS

(71) Applicant: Dell Products L.P., Round Rock, TX (US)

(72) Inventors: Dirie N. Herzi, Leander, TX (US); Michael David Shepherd, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 14 days.

(21) Appl. No.: 14/846,416

(22) Filed: Sep. 4, 2015

(51) Int. Cl.
| G06F 11/00 | (2006.01) |
| G06F 11/32 | (2006.01) |
| G06F 11/07 | (2006.01) |
| G06F 11/22 | (2006.01) |
| G06F 11/30 | (2006.01) |
| G06F 13/24 | (2006.01) |

(52) U.S. Cl.
CPC ......... *G06F 11/327* (2013.01); *G06F 11/073* (2013.01); *G06F 11/2231* (2013.01); *G06F 11/3037* (2013.01); *G06F 13/24* (2013.01)

(58) Field of Classification Search
USPC .......................................... 714/42
See application file for complete search history.

(56) References Cited

U.S. PATENT DOCUMENTS

| 7,298,659 | B1* | 11/2007 | Kengeri | G11C 29/06 365/154 |
| 2003/0115385 | A1* | 6/2003 | Adamane | G01R 31/31715 710/22 |
| 2003/0236451 | A1* | 12/2003 | El-Nokaly | A61B 5/16 600/300 |
| 2004/0208071 | A1* | 10/2004 | Mukunoki | G11C 29/12 365/201 |
| 2014/0189433 | A1* | 7/2014 | Schoenborn | G11C 29/06 714/42 |

* cited by examiner

Primary Examiner — Sarai Butler
(74) Attorney, Agent, or Firm — Baker Botts L.L.P.

(57) ABSTRACT

Defective memory may cause expensive and unnecessary replacements of the memory especially for higher density dynamic random access memory that has ever shrinking topologies. Running memory stress tests in the background for a period of time at set intervals while the operating system is idle may detect and identify memory problems in real-time without requiring a re-boot of the information handling system. The memory defects may be repaired in real-time so as not to cause loss of data by future read or write requests to the identified defective memory.

20 Claims, 3 Drawing Sheets

FIG. 2A

SYSTEMS AND METHODS FOR DETECTING MEMORY FAULTS IN REAL-TIME VIA SMI TESTS

TECHNICAL FIELD

The present disclosure relates in general to information handling systems, and more particularly to capitalize on testing memory via storage management interrupt (SMI) in real-time while the operating system of an information handling system is idle.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems employ memories to store instructions and data. From time to time, certain portions of such memories may acquire a defect, making such portions unusable. Traditionally, the occurrence of such defects required replacement of such memory, which may be costly in terms of labor and hardware, as well as system downtime. More recent approaches to such failures and defects have included the use of error correction code (ECC) memory which requires significant logic and/or software complexity and significant cost to add the extra parity bit component and register.

Further, up to 8% or more of dynamic random access memory (DRAM) modules are affected by single bit failures. As DRAM sizes grow, the need to provide a methodology for repairing marginally faulty cells in non-error correcting code (non-ECC) memory based platforms continues to increase. Some methods, such as enhanced pre-boot system assessment (ePSA) fault tolerant memory feature, may resolve some faulty cell issues post failure by mapping out failing memory regions of the DRAM. However, memory diagnostics must be ran before failure occurs or data corruption and/or a loss of content may occur. On servers, ECC memory allows single bit correction to be performed in real-time, however on client devices, or traditionally consumer information handling systems, no such capability exists.

Further, row hammer tests require special stress algorithms to identify row to row coupling. Such coupling is identified by constantly toggling one row to see if the data of an adjacent row changes. This constant toggling requires a significant amount of time and is seldom executed to the extent necessary to discover all the problems or issues with the memory. Prior solutions rely on the need for ECC memory or memory testing if performed only after a problem is seen by an end user. For example, in one prior solution ePSA must be ran before any memory fix may be implemented which may result in data corruption as client memory does not have ECC. The present disclosure contemplates executing certain procedures in the background during OS operation such that normally prohibitively long typical factory memory tests may be implemented.

SUMMARY

In accordance with the teachings of the present disclosure, the disadvantages and problems associated with memory failures are reduced or eliminated.

In accordance with embodiments of the present disclosure, a method may comprise receiving by an information handling system a system management interrupt (SMI) and determining if a processor of the information handling system is in an idle state. A memory stress test is performed on a memory (or one or more locations of the memory) for a predetermined memory stress test time period during which the memory being tested is not available for use, for example, by any application or the operating system (OS). The method detects whether post package repair (PPR) is supported by the information handling system and likewise the processor. The information handling system may include any number of processors and any processor may be capable of spawning any number of threads and including any number of processing cores. If PPR support is available, then the method continues with the PPR support receiving a memory indicator from the memory stress test where the memory error indicator indicates that the memory being tested includes a defective memory portion. The memory being tested may include any number of memory portions that are defective. The PPR support may apply a repair to the defective memory portion whereupon the memory being tested is release or rather made available for use by the OS or applications.

In accordance with embodiments of the present disclosure, an information handling system may include an information handling system, one or more processors of the information handling system, a memory communicatively coupled to the one or more processors, and one or more modules that comprise instructions stored in the memory. The one or more instructions may, when read and executed by the one or more processors, be operable to perform operations that include receiving at the information handling system an SMI, determining if the one or more processors are in an idle state, performing a memory stress test on one or more memory locations for a predetermined memory stress test time period, wherein during the memory stress test the one or more memory locations are not available, for example, not accessible by the OS or applications, detecting PPR support, receiving by the PPR support a memory error indicator from the memory stress test where the memory error indicator indicates that the one or more memory locations include a defective memory portion, applying by the PPR support, a repair to the defective memory portion, and releasing the one or more memory locations.

In further embodiments of the present disclosure, an article of manufacture, may include a computer-readable non-transitory storage media and computer-executable instructions carried on the computer-readable non-transitory storage medium of a computer system (or an information handling system), where the instructions, when read and executed, may cause a processor of the computer system to: receive at the computer system a SMI, determine if the one or more processors are in an idle state, perform a memory stress test on one or more memory locations for a predetermined memory stress test time period, where during the memory stress test the one or more memory locations are not available, for example, not accessible by the OS or applications, detect PPR support, receive by the PPR support a memory error indicator from the memory stress test where the memory error indicator indicates that the one or more memory locations include a defective memory portion, apply by the PPR support, a repair to the defective memory portion, and release the one or more memory locations.

Technical advantages of the present disclosure will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
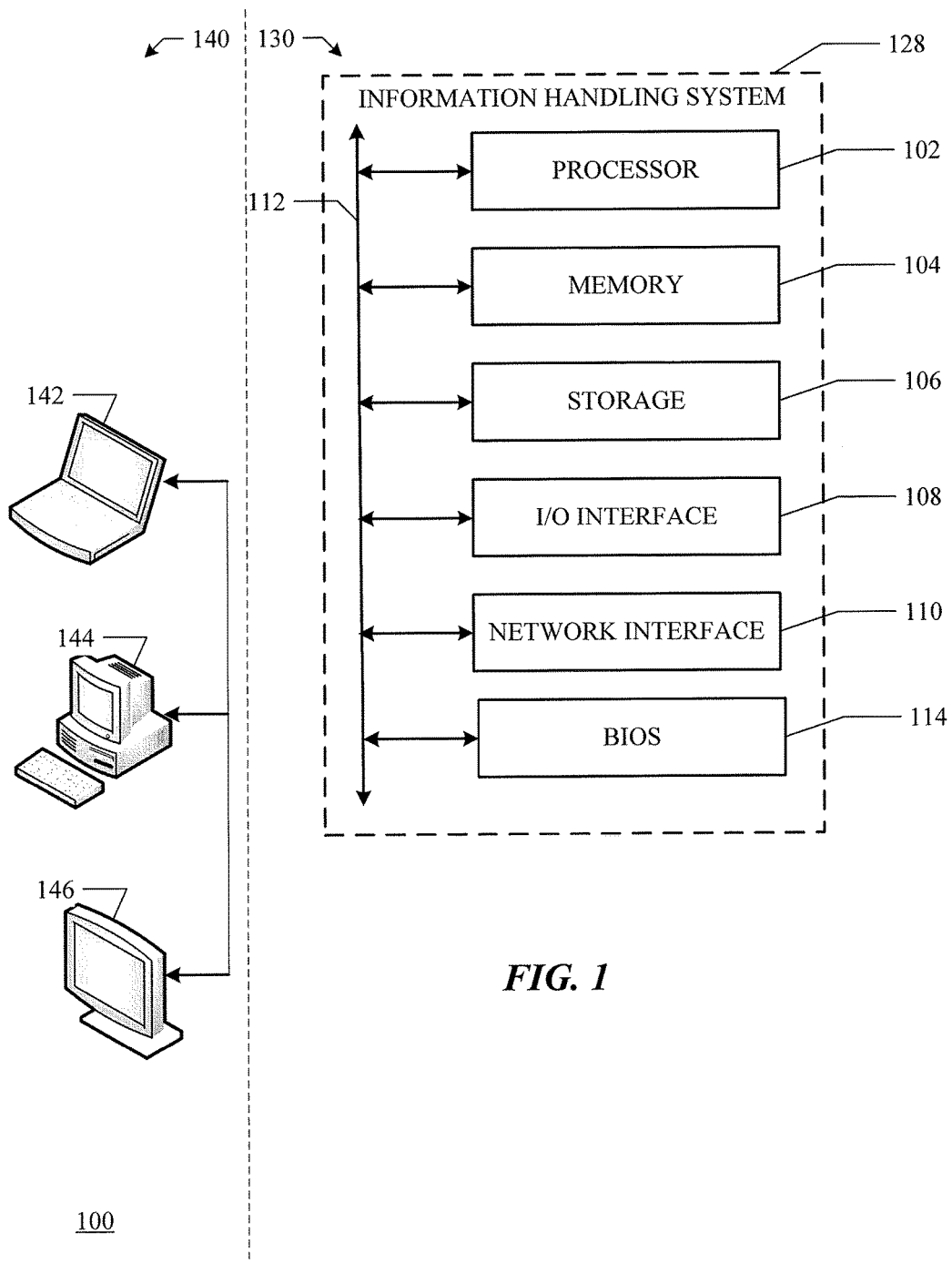
FIG. 1 illustrates a block diagram of an example information handling system, in accordance with certain embodiments of the present disclosure.

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

This disclosure generally relates to implementation of information handling systems and, in particular, relates to the capitalization on testing memory via system management interrupt (SMI) while the information handling system is operational and idle. In general, higher density dynamic random access memory (DRAM) and any other higher density random access memory with shrinking topologies may be susceptible to adjacent row failures. DRAM may include redundant rows so as to remap bad circuits and improve yields. Such remapping is done at die sort using an "efuse" technology for double data rate type three (DDR3) and available via post package repair in double data rate type four (DDR4) which makes the "efuse" technology accessible to the controller. However, high levels of memory testing may be capable of being performed in the operating system (OS) due to memory utilization in a multi-threaded environment. The present disclosure provides a system and method for having the basic input/output system (BIOS) execute memory testing in SMI when the information handling system is operational and idle which allows continuous memory testing that has a minimum amount of impact to the information handling system, such as, not impacting performance.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer (tablet or laptop or desktop or server or any other information handling system known to one of ordinary skill in the art) a network storage device, or any other suitable device and may vary in size, shape, performance, functionality, and price. The information handling system may include random access memory (RAM), dynamic random access memory (DRAM), system management RAM (SMRAM), one or more processing resources such as a central processing unit (CPU) or hardware or software control logic, ROM, and/or other types of nonvolatile memory. Additional components of the information handling system may include an interface to a virtual machine manager, an interface to a web console, an interface to a management console, a remote access controller, a hypervisor, one or more disk drives, one or more network ports for communication with external devices as well as various input output (I/O) devices, such as a keyboard, a mouse, and a video display. The information handling system may also include one or more buses operable to transmit communications between the various hardware components.

For the purposes of this disclosure, computer-readable storage media may include any instrumentality or aggregation of instrumentalities that may retain data and/or instructions for a period of time. Computer-readable non-transitory storage media may include, for example, without limitation, storage media such as a direct access storage device (for example, a hard disk drive or floppy disk), a sequential access storage device (for example, a tape disk drive), compact disk, DRAM, CD-ROM, DVD, RAM, ROM, electrically erasable programmable read-only memory (EE-PROM), and/or flash memory.

FIG. 1 illustrates an information handling system environment 100 that can be implemented on one or more information handling systems. For purposes of this disclosure, an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a laptop computer, a smart phone, a tablet device or other consumer electronic device, a network server, a network storage device, a switch, a router, or another network communication device, or any other suitable device known to one of ordinary skill in the art and may vary in size, shape, performance, functionality, and price. Further, an information handling system may include processing resources for executing machine-executable code, such as a central processing unit (CPU), a programmable logic array (PLA), an embedded device such as a System-on-a-Chip (SoC), or other control logic hardware. An information handling system may also include one or more computer-readable medium for storing machine-executable code, such as software or data. Additional components of an information handling system can include one or more storage devices that can store machine-executable code, one or more communications ports for communicating with external devices, and various I/O devices, such as a keyboard, a mouse, and a video display. An example of an information handling system includes a multi-tenant chassis system where groups of tenants (users) share a common chassis, and each of the tenants has a unique set of resources assigned to them. The resources can include blade servers of the chassis, I/O modules, Peripheral Component Interconnect-Express (PCIe) cards, storage controllers, and the like.

Information handling system environment 100 includes a user environment 140 and a system environment 130. User environment 140 may comprise user systems 142, 144, and 146. User systems 142, 144, and 146 may be any type of information handling system known to one of ordinary skill in the art. For example, user systems 142, 144, and 146 may be laptop computers, PCs, thin-clients, smart monitors, tablets, phablets, or any other device known to one of ordinary skill in the art that can connect to a network as an endpoint for information handling system environment 130. In one embodiment 130 and 140 may be a single system in one location. That is, while information handling system 128 is shown separately from the user environment 140, one of ordinary skill in the art understands that user systems 142, 144, and 146 may be included as part of information handling system 128. In another embodiment, environments 130 and 140 may represent a distributed environment such as a virtual desktop infrastructure (VDI) where the user environment 140 is located remotely from the information handling system environment 130. While three devices are shown as user systems 142, 144, and 146, one of ordinary skill in the art understands that user systems 142, 144, and 146 may be any number of suitable devices.

Information handling system 128 may comprise any number of devices and may be any number of information handling systems suitable to implement required tasks. Information handling system 128 includes a processor 102, basic input/output system (BIOS) 114, memory 104, storage 106, an input/output (I/O) interface 108, a network interface 110, and a bus(es) 112. Although this disclosure describes and illustrates a particular information handling system 128 having a particular set of particular components in a particular arrangement, this disclosure contemplates any suitable information handling system having any suitable combination and arrangement of components as known to one of ordinary skill in the art.

In an example embodiment, processor 102 may include hardware and software components for the structure and operation of the process steps and system disclosed. While not specifically shown, it should be understood that any number of program modules comprising computer-readable instructions may be stored in the information handling system 128, storage 106 (a computer-readable medium) or other memory and may be executed by processor 102. In one or more embodiments, processor 102 may be a central processing unit (CPU). Upon execution of the computer-readable instructions stored in a computer-readable medium, certain actions may be performed as described in this disclosure.

BIOS 114 is stored in non-volatile memory. BIOS 114 may include one or more settings associated with the operation of the information handling system 128. For example, BIOS 114 may include a setting associated with the periodicity for testing memory via SMI. Storage 106 or memory 104 or other such memory may be a hard-disk drive, magnetic disk, optical disk, DRAM, ROM, RAM or any other computer media known to one of ordinary skill in the art for the storage and retrieval of data, including executable or computer-readable instructions. Data may be stored in any one or more of storage 106 and memory 104. As is known to one of ordinary skill in the art, some storage mediums have faster data access times than other storage mediums. For example, long-term data or data that does not need to be accessed frequently or quickly may generally be stored on a hard-disk drive or other non-volatile storage medium, such as storage 106, known to one of ordinary skill in the art. Retrieving and storing data to storage 106 may increase the time to perform an I/O operation as access times are typically longer than performing I/O operations from a faster storage medium, for example, memory 104. Memory 104 and storage 106 may be communicatively coupled to processor 102 and may include any system, device, or apparatus configured to retain program instructions and/or data for a period of time (for example, computer-readable storage media).

In one embodiment, storage 106 is non-volatile long-term memory such as a hard-disk drive, magnetic disk, optical disk or any other storage device known to one of ordinary skill in the art. Storage 106 typically has a longer access time than memory 104. In one embodiment, memory 104 may be memory with reasonably fast access times, such as RAM or DRAM. Memory 104 may be any memory known to one of ordinary skill in the art that provides efficient access to data, for example, RAM or DRAM. In another embodiment, memory 104 includes main memory for storing instructions for processor 102 to execute or data for processor 102 to operate on. As an example, information handling system 128 may load instructions for execution from storage 106 or another source (such as, for example, another information handling system 128, an external memory source, a remote memory source, or any other memory source known to one of ordinary skill in the art) to memory 104. Bus 112 may include one or more buses for connecting processor 102, memory 104, storage 106, I/O interface 108 and network interface 110.

In another embodiment, I/O interface 108 includes hardware, software, or both for providing one or more interfaces for communication between information handling system 128 and one or more I/O devices. Information handling system 128 may include one or more I/O devices, where appropriate. One or more of these I/O devices may enable communication between an individual or other software and information handling system 128. As an example, an I/O device may include a keyboard, keypad, microphone, monitor, mouse, or any other I/O device known to one of ordinary skill in the art or a combination of two or more I/O devices. For example, the I/O device may allow an individual or other software to request instantiation of a virtual application. I/O interface 108 may include one or more devices or software drivers enabling processor 102 to drive one or more of these I/O devices. I/O interface 108 may include one or more I/O interfaces 108, where appropriate. Although this disclosure describes and illustrates a particular I/O interface, the disclosure contemplates any suitable I/O interface.

In an example embodiment, network interface 110 includes firmware, hardware, software, or any combination thereof for providing one or more interfaces for communication (for example, packet-based communication) between information handling system 128 and one or more other information handling systems 128 on one or more networks. For example, network interface 110 may include a network interface controller (NIC) or network adapter for communicating with a telephone network, an Ethernet or other wire-based network or a wireless NIC (WNIC) or wireless adapter for communicating with a wireless network, such as a WI-FI network, or any other network interface for communicating with any type of network known to one of ordinary skill in the art. In one embodiment, information handling system 128 may connect to user systems 142, 144, and 146 through a network via a wireless or wired connection using any protocol known to one of ordinary skill in the art.

In an example embodiment, bus 112 includes hardware, software, or both which couples components of information handling system 128 to each other. Bus 112 may include one or more buses where appropriate and may communicatively, physically, virtually, or otherwise as required couple the components of information handling system 128 to each other. Bus 112 may connect one or more information handling systems 128 to each other.

Figure 2A:
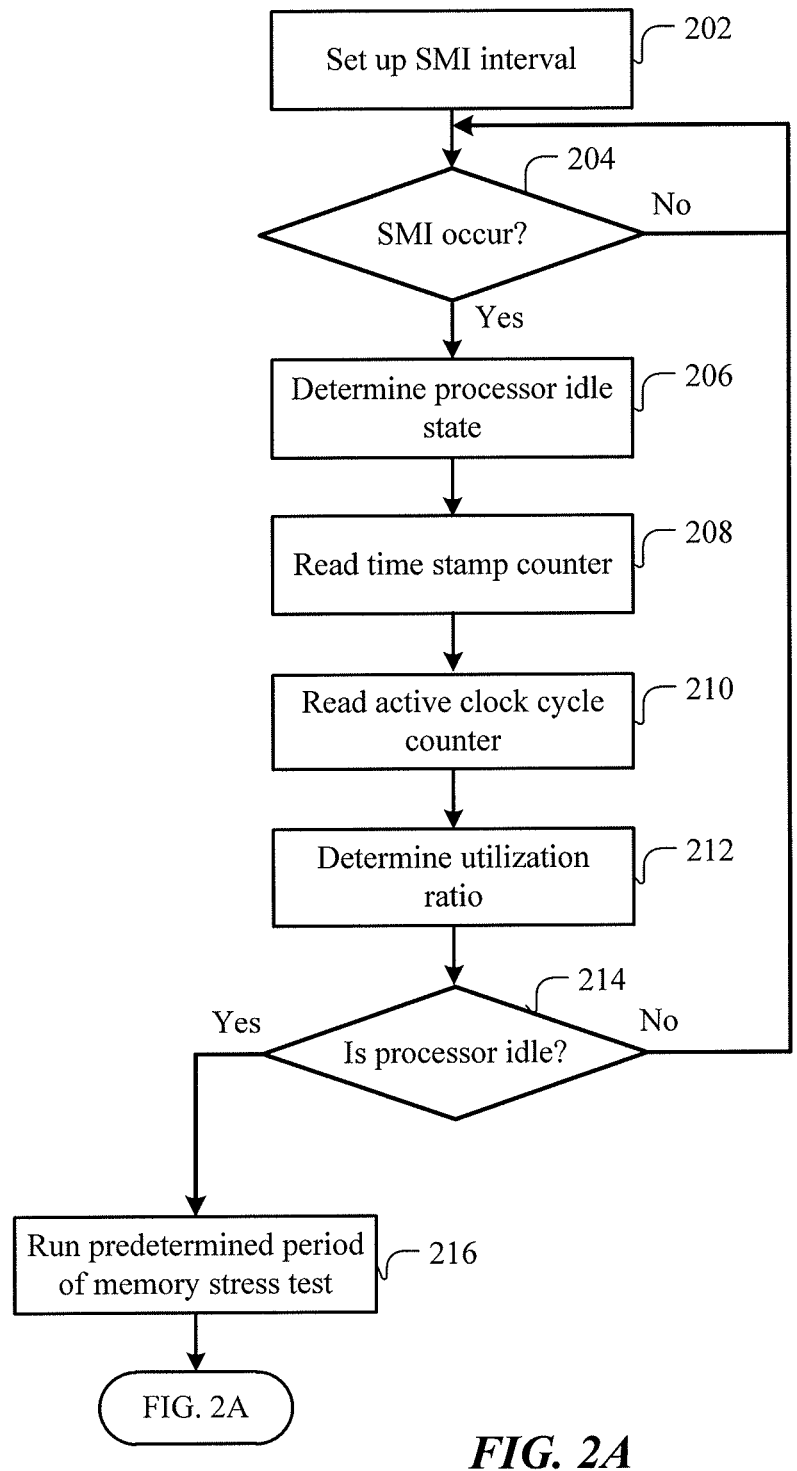
FIG. 2A illustrates a flow chart of an example method in accordance with certain embodiments of the present disclosure.

FIG. 2A illustrates a method in accordance with certain embodiments of the present disclosure. At step 202, the time period or interval for issuing an SMI is established. Such may be referred to throughout as an SMI time period, SMI interval, or SMI timer. In one embodiment, the SMI interval is stored in the BIOS and is a setting available via BIOS interface. In one or more embodiments, the SMI interval may be set via a graphical user interface (GUI), a command-line interface, a pre-set configuration of the BIOS, or by any other interface or way known to one of ordinary skill in the art. In one embodiment, setting the SMI interval may require a password. For example, the SMI interval may be a password protected setting in the BIOS. The SMI interval may be set according to any interval of time, for example, milliseconds, seconds, microseconds, nanoseconds, or any other interval of time known to one of ordinary skill in the art.

At step 204, it is determined if an SMI occurred. In one embodiment, the information handling system 128 may only perform a memory stress test when an SMI occurs. The SMI occurs based, at least in part, on the SMI interval set in step 202. If an SMI has not occurred at step 204, then the method may continue to poll to determine if an SMI has occurred. In one embodiment, information handling system 128 continuously polls, polls on a predetermined interval, polls according to one or more parameters associated with processor 102 or any other polling or detecting known to one of ordinary skill in the art to determine if an SMI has occurred. If an SMI has occurred, the method continues to step 206.

At step 206, the idle state of the processor 102 is determined. A memory stress test is performed when the OS is not actively storing and retrieving data from memory. For example, it may be determined that the processor 102 is in sleep mode. The idle state of the processor 102 may be determined in one or more embodiments by implementing steps 208, 210, and 212 or by using any other criteria known to one of ordinary skill in the art. In one embodiment, one or more criteria may be used in lieu of or in addition to steps 206-212. For example, in one embodiment, the power source may be determined prior to step 206 or in lieu of steps 206-212. If the power source is a temporary power source, such as a battery, then at step 214 it would be determined to continue to step 204, for example, and not to perform the memory stress test at step 216. For example, an information handling system 128 powered via a battery may not have sufficient remaining power to support execution of the memory stress test while continuing proper operational status of the information handling system 128. In such an example, it is best and more user-friendly not to deplete any remaining power by execution of the memory stress test.

In one embodiment when the processor is not determined to be idle at step 214, or because of some other inhibiting factor, for example, non-stable power source, such as a battery, detected, the method may continue at step 204. In another embodiment instead of continuing to step 204, the method may continue at step 226 such that the SMI interval is modified. In another embodiment, the method may set a flag or other semaphore so as not to continue any SMI analysis until a stable, such as an alternating current (A/C) power source from an outlet (a stable power source), is connected to the information handling system 128.

In one or more embodiments, processor 102 may be a single processor, two processors, or any number of processor. Processor 102 may include one or more processor cores. When multiple processor cores exists, then, if an SMI has occurred at step 204, at step 206 it must be determined the idle state of all or at least one or more processor cores based, at least in part, on one or more indicators, criteria, factors and/or parameters.

As part of determining the processor idle state, at step 208, one type of idle state indicator (the time stamp counter) is read. The time stamp counter indicates how long the processor 102 has been inactive or in sleep mode. In one embodiment, only step 208 may be implemented to determine the processor 102 idle state. For example, at step 214 the processor may be determined to be idle based, at least in part, on comparing the time stamp counter to a predetermined threshold associated with the time stamp counter. The time stamp counter predetermined threshold may be a BIOS setting (hard-coded or adjustable) or any other time stamp counter predetermined threshold known to one of ordinary skill in the art. At step 214 it may be determined that the processor 102 is idle based, at least in part, on the time stamp counter.

At step 210 another idle state indicator, a register value indicative of how long a processor 102 has been active (active clock cycle counter), is read. For example, C0_MCNT or C0MCNT may be read to determine how long a processor 102 has been active. Each processor 102 may have a corresponding active clock cycle counter. Likewise, each thread of a processor 102 may have a corresponding active clock cycle counter with the active clock cycle counter value for a given processor 102 equaling the sum of all the active clock cycle counters for all the threads of the processor 102.

At step 212 another idle state indicator, the utilization ratio for processor 102, is determined. The utilization ratio is determined by dividing the active clock cycle counter value from step 210 by the time stamp counter from 208. In one embodiment, processor 102 includes multiple processor cores and the utilization ratio must be determined for each processor core.

At step 214, it is determined if the processor 102 is idle. In one embodiment, the processor 102 is determined to be idle by comparing the utilization ratio from step 212 to a predetermined threshold associated with the utilization ratio. The utilization ratio predetermined threshold may be a BIOS setting (hard-coded or adjustable) or any other utilization ratio predetermined threshold known to one of ordinary skill in the art. For example, in one embodiment, if the utilization ratio is less than 1%, which means the processor 102 is in sleep state 99% of the time, then at step 214 it would be determined that the processor is idle and the method would continue to step 216 to perform the memory stress test for the predetermined memory stress test time period.

In other embodiments, one or more criteria may be used in lieu of or in addition to steps 208-212. In one embodiment, storage system utilization may be checked to determine whether an information handling system 128 is idle. For example, it may be determined if large amounts of data are being copied to a memory location, such as a hard disk drive. In such an embodiment, the processor 102 may be mainly idle but other components of the information handling system 128 may be busy copying data such that a memory stress test during the copying would interfere with or at least delay the copying of the data and thus the memory stress test would not be performed.

At step 214, if it is determined that the processor 102 is not idle, then the method continues at step 204. If it is determined at step 214 that the processor 102 is idle, then at step 216, a memory stress test is performed for a predetermined period of time (memory stress test time period). In one embodiment, the memory stress test is ran in the background while other operations, that do not require access to the memory to be tested, of the information handling system 128 are performed. In another embodiment, the memory stress test may be the only operation being performed at the information handling system 128. During the memory stress test, the tested memory is not available to the OS or any applications so as to prevent loss of data or improper operation of the information handling system 128. A memory stress test may be provided by the manufacturer of the memory to be tested, a third party application, or any other memory test known to one of ordinary skill in the art. A memory stress test may be an OS memory test, a BIOS memory test, a diagnostics memory test or any other memory test known to one of ordinary skill in the art, but the memory stress test must run in SMI, and the entire test may not be performed in one interval or a single memory stress test time interval. For example, the memory stress test may test 0.1% of a memory, then wait for the next SMI timer and test another 0.1%, such that over 1000 SMIs may be required to complete the memory stress test. In this example, if the period is 1 second between SMIs and 1 millisecond per memory stress test, then it would take 1001 seconds to complete the memory stress test.

The predetermined period of time may be a value stored as a BIOS setting, a value stored in memory 104 or storage 106, or any other value known to one of ordinary skill in the art. The memory stress test time period (length of time the memory stress test is executed) may be a fixed value or an adjustable value. In one embodiment, the memory stress test time period may be set via a GUI, a command-line interface or any other interface known to one of ordinary skill in the art. In one embodiment, the memory stress test time period may require a password before it can be modified. The value of the memory stress test time period may be based, at least in part, on the type of information handling system 128, the number of processors 102, how the information handling system 128 is being used, the type of applications executing on the information handling system 128, the utilization ratio, or any other criteria known to one of ordinary skill in the art. In one embodiment, the memory stress test time period is set to a value of less than or equal to 100 milliseconds. Once the memory stress test has ran for the requisite memory stress test time period, the method continues to FIG. 2B.

Figure 2B:
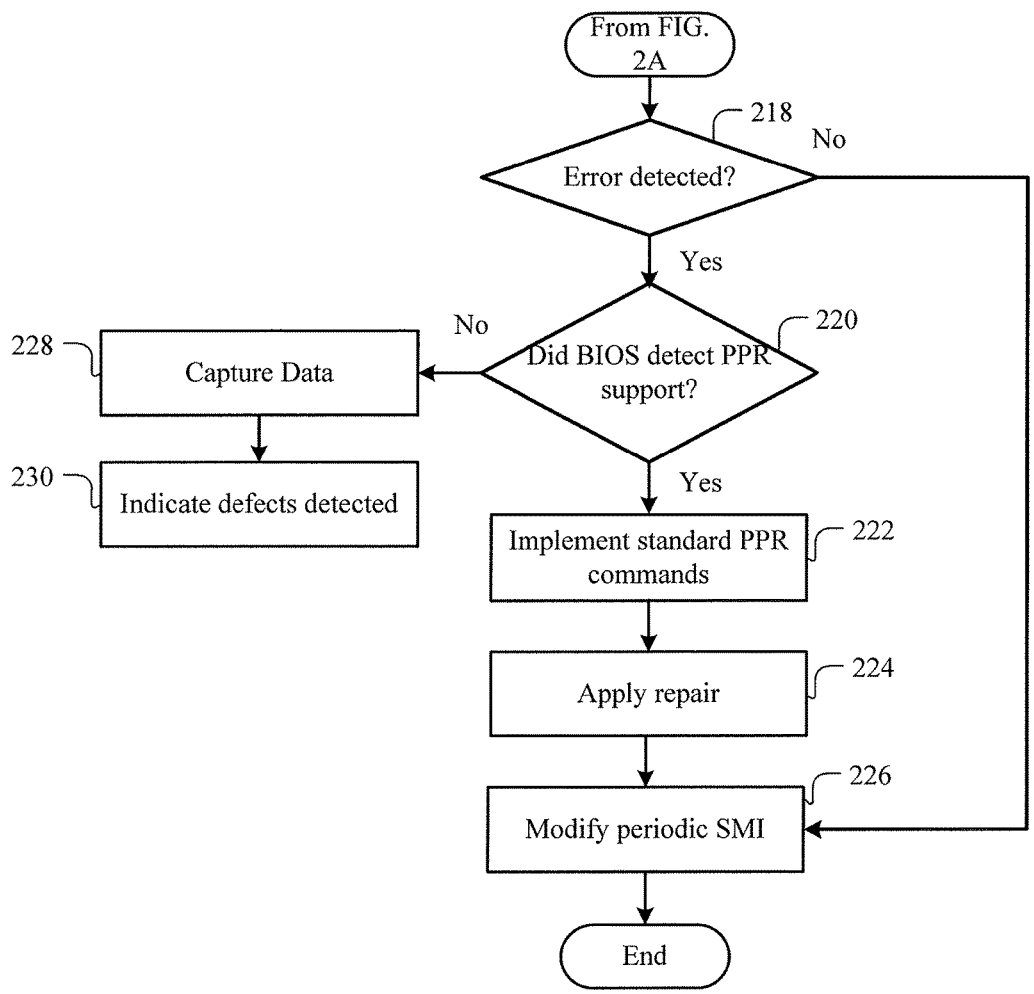
FIG. 2B illustrates a flow chart of an example method in accordance with certain embodiments of the present disclosure.

FIG. 2B illustrates a flow chart of an example method in accordance with certain embodiments of the present disclosure. As noted above, teachings of the present disclosure may be implemented in a variety of configurations of information handling system 128.

At step 218, it is determined if a memory error was detected from step 216 of FIG. 2A. For example, a data structure, specific memory location, table entry, database entry, an array or any other way for passing or storing information as known to one of ordinary skill in the art may be used as an indicator of the memory error. The memory error may indicate that a defective portion of memory was detected during the memory stress test and may identify the location of the defective portion of memory. The identified defective portion of memory may be indicative of a block of memory, a cell of memory or any other segment or division of memory known to one of ordinary skill in the art. The memory stress test may generate a memory error indicator that identifies the defective portion of memory. If a memory error is not detected at step 218, then the method continues to step 226. In one embodiment, if no error is detected the method continues to step 204. If a memory error is detected then corrective action may be taken such as mapping out the bad raw memory with the spare raw memory. The BIOS will also store that the memory error has been repaired or fixed in the serial presence detect (SPD) (EEPROM attached to the dual inline memory module (DIMM)). Such may be informative for a future boot of the information handling system 128 if uncorrectable DIMMs have already been Single Bit corrected with post package repair (PPR).

If an error is detected at step 218, then at step 220 it is determined if the BIOS detects PPR support. If PPR is not supported, then at step 228 data may be captured for use along with any indicated defects at step 230. That is, if PPR is not supported the necessary data must be stored along with any information related to the failure so that during the next boot of the information handling system 128 the portions of tested memory identified as having defects are not allocated or used by an application or the OS. This is done by reserving the memory for the BIOS.

If PPR is determined to be supported at step 220, then at step 222 standard PPR commands are issued and at step 224 any necessary repairs to the tested memory are applied and the memory associated with the memory stress test is released such that it is available for use. Once the BIOS detects an error and utilizes PPR to repair or fix any errors, no further action is needed by the information handling system 128 or processor 102. The repair or fix is applied at the DIMM level such that the information handling system 128 and processor 102 continue to operate normally with respect to reading/writing the raw data. The information handling system 128 or the processor 102 are oblivious to any repair or fix performed as a result of the memory stress test.

At step 224, the periodicity of SMI (SMI interval) may be modified. For example, in one embodiment, the SMI interval is lengthened such that a memory stress test is executed or implemented less frequently or is shortened such that a memory stress test is ran more frequently. Modification of the SMI interval may be based, at least in part, on one or more criteria. For example, the SMI interval may be lengthened or shortened depending on whether any errors were detected (the memory error indicator) during a prior memory stress test, the number of processors 102, the utilization ratio, known or predicted reliability of the tested memory, increase or decrease in system utilization, removal of stable power source, increase or decrease in temperature or any other criteria known to one of ordinary skill in the art.

Although FIG. 2A and FIG. 2B disclose a particular number of steps to be taken each may be executed with greater or lesser steps than those depicted. In addition, although FIG. 2A and FIG. 2B discloses a certain order of steps to be taken, the steps of each may be completed in any suitable order.

The methods of FIG. 2A and FIG. 2B may be implemented numerous times before the memory stress test has tested all of the memory to be tested. The number of iterations may be based, at least in part, on the size of the memory to be tested, the memory stress test time period, or any other criteria known to one of ordinary skill in the art.

Methods of FIG. 2A and FIG. 2B may be implemented using information handling system 128 or any other system operable to implement methods. In certain embodiments, the methods of FIG. 2A and FIG. 2B may be implemented partially or fully in software and/or firmware embodied in computer-readable media.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The concepts disclosed in this application should not be understood to be limited to the exemplary embodiments described herein, but should be understood to encompass all changes, substitutions, variations, alterations, and modifications to the example embodiments herein that a person having ordinary skill in the art would comprehend. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising: receiving, at an information handling system, a system management interrupt (SMI); determining if a processor is in an idle state; performing a memory stress test on a memory for a predetermined memory stress test time period, wherein during the memory stress test the memory is not available; detecting a post package repair (PPR) support; receiving, by the PPR support, a memory error indicator from the memory stress test, wherein the memory error indicator indicates that the memory includes a defective memory portion; applying, by the PPR support, a repair to the defective memory portion; and releasing the memory.

2. The method of claim 1, wherein the determining if the processor is in an idle state is based, at least in part, on a utilization ratio.

3. The method of claim 1, wherein the memory stress test is only performed if a power source is not from a temporary power source.

4. The method of claim 1, wherein the SMI occurs based, at least in part, on an SMI time interval.

5. The method of claim 4, further comprising: modifying the SMI time interval after performing the memory stress test.

6. The method of claim 5, wherein the SMI time interval is modified based, at least in part, on the memory error indicator.

7. The method of claim 1, wherein the memory stress test time period is based, at least in part, on one or more of type of the information handling system, a number of processors of the information handling system, and a utilization ratio.

8. A system comprising: an information handling system; one or more processors for processing information of the information handling system; a memory of the information handling system communicatively coupled to the one or more processors; and one or more modules that comprise instructions stored in the memory, the instructions, when executed by the one or more processors, operable to perform operations comprising: receiving, at the information handling system, a system management interrupt (SMI); determining if the one or more processors are in an idle state; performing a memory stress test on one or more memory locations for a predetermined memory stress test time period, wherein during the memory stress test the one or more memory locations are not available; detecting a post package repair (PPR) support; receiving, by the PPR support, a memory error indicator from the memory stress test, wherein the memory error indicator indicates that the one or more memory locations include a defective memory portion; applying, by the PPR support, a repair to the defective memory portion; and releasing the one or more memory locations.

9. The system of claim 8, wherein the determining if the one or more processors are in an idle state is based, at least in part, on a utilization ratio.

10. The system of claim 8, wherein the memory stress test is only performed if a power source is not from a temporary power source.

11. The system of claim 8, wherein the SMI occurs based, at least in part, on an SMI time interval.

12. The system of claim 11, wherein the instructions further operable to perform operations comprising: modifying the SMI time interval after performing the memory stress test.

13. The system of claim 12, wherein the SMI time interval is modified based, at least in part, on the memory error indicator.

14. The system of claim 8, wherein the memory stress test time period is based, at least in part, on one or more of type of the information handling system, a number of processors of the information handling system, and a utilization ratio.

15. One or more computer-readable non-transitory storage media embodying one or more instructions operable when executed by one or more information handling systems to: receive, at the one or more information handling systems, a system management interrupt (SMI); determine if a processor is in an idle state; perform a memory stress test on a memory for a predetermined memory stress test time period, wherein during the memory stress test the memory is not available; detect a post package repair (PPR) support; receive, by the PPR support, a memory error indicator from the memory stress test, wherein the memory error indicator indicates that the memory includes a defective memory portion; apply, by the PPR support, a repair to the defective memory portion; and release the memory.

16. The media of claim 15, wherein determine if the processor is in an idle state is based, at least in part, on a utilization ratio.

17. The media of claim 15, wherein the memory stress test is only performed if a power source is not from a temporary power source.

18. The media of claim 15, wherein the SMI occurs based, at least in part, on an SMI time interval.

19. The media of claim 18, wherein the one or more instructions are further operable when executed to: modify the SMI time interval after performing the memory stress test.

20. The media of claim 19, wherein the SMI time interval is modified based, at least in part, on the memory error indicator.

* * * * *